United States Patent Office 3,348,442
Patented Oct. 24, 1967

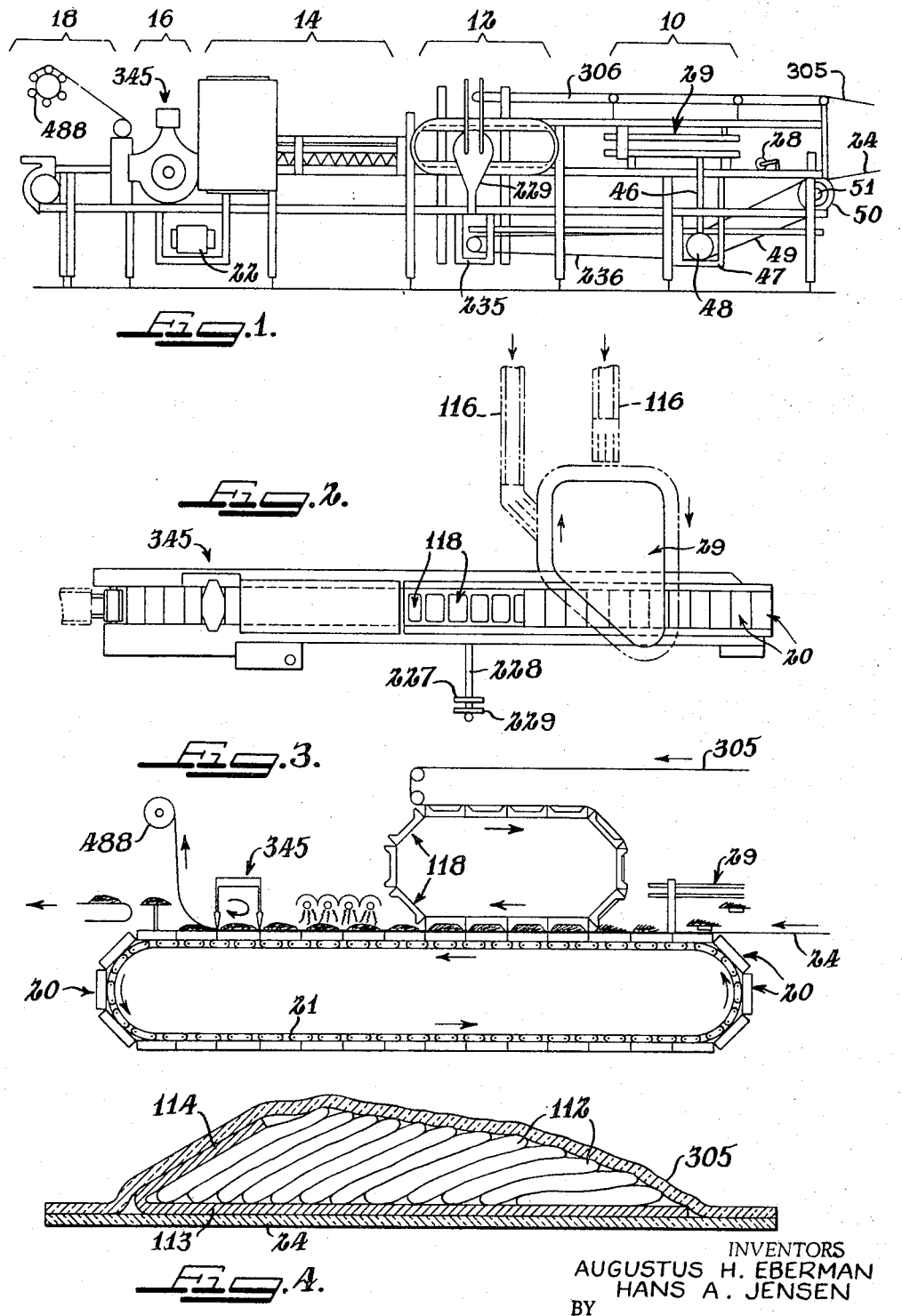

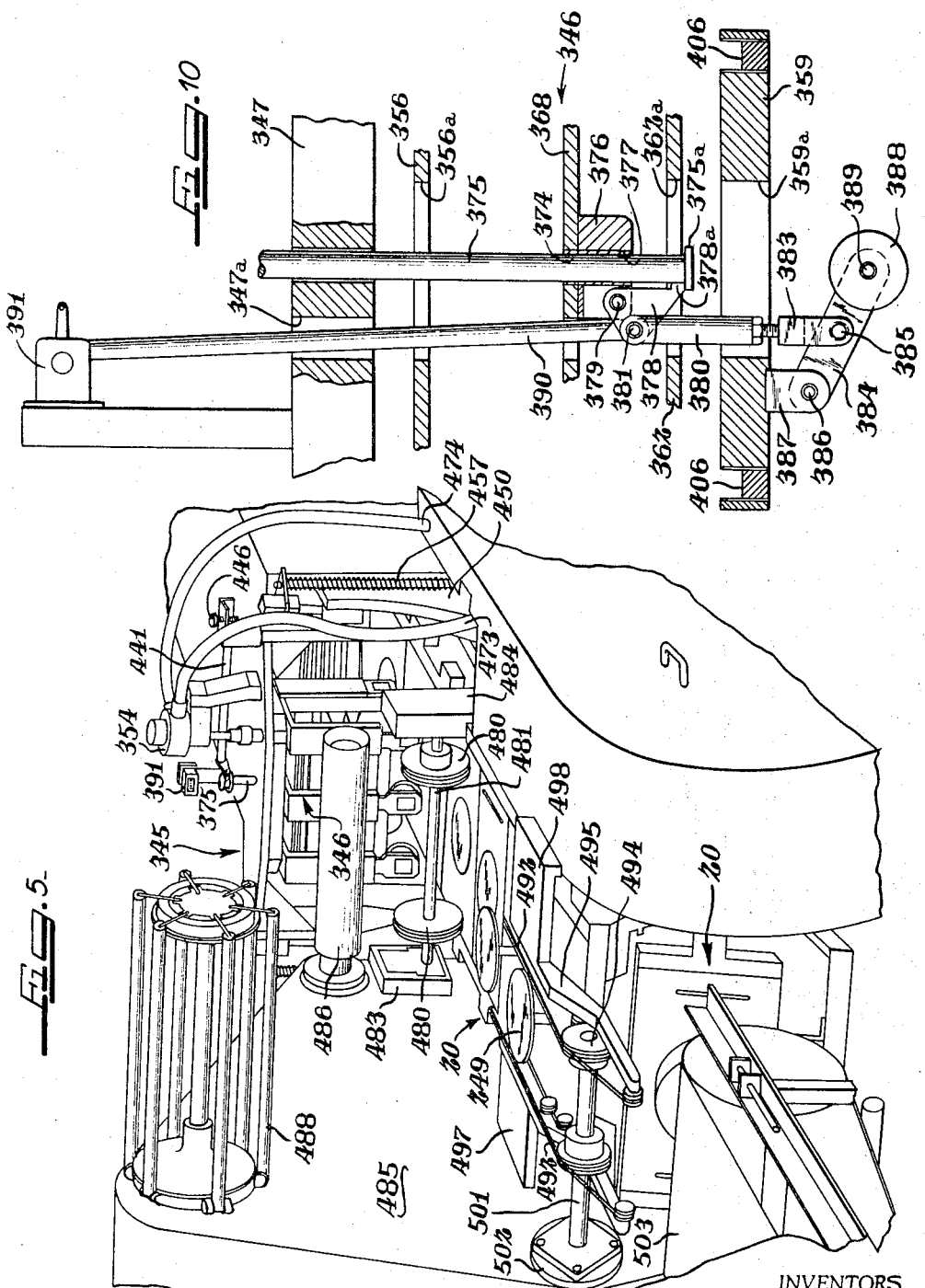

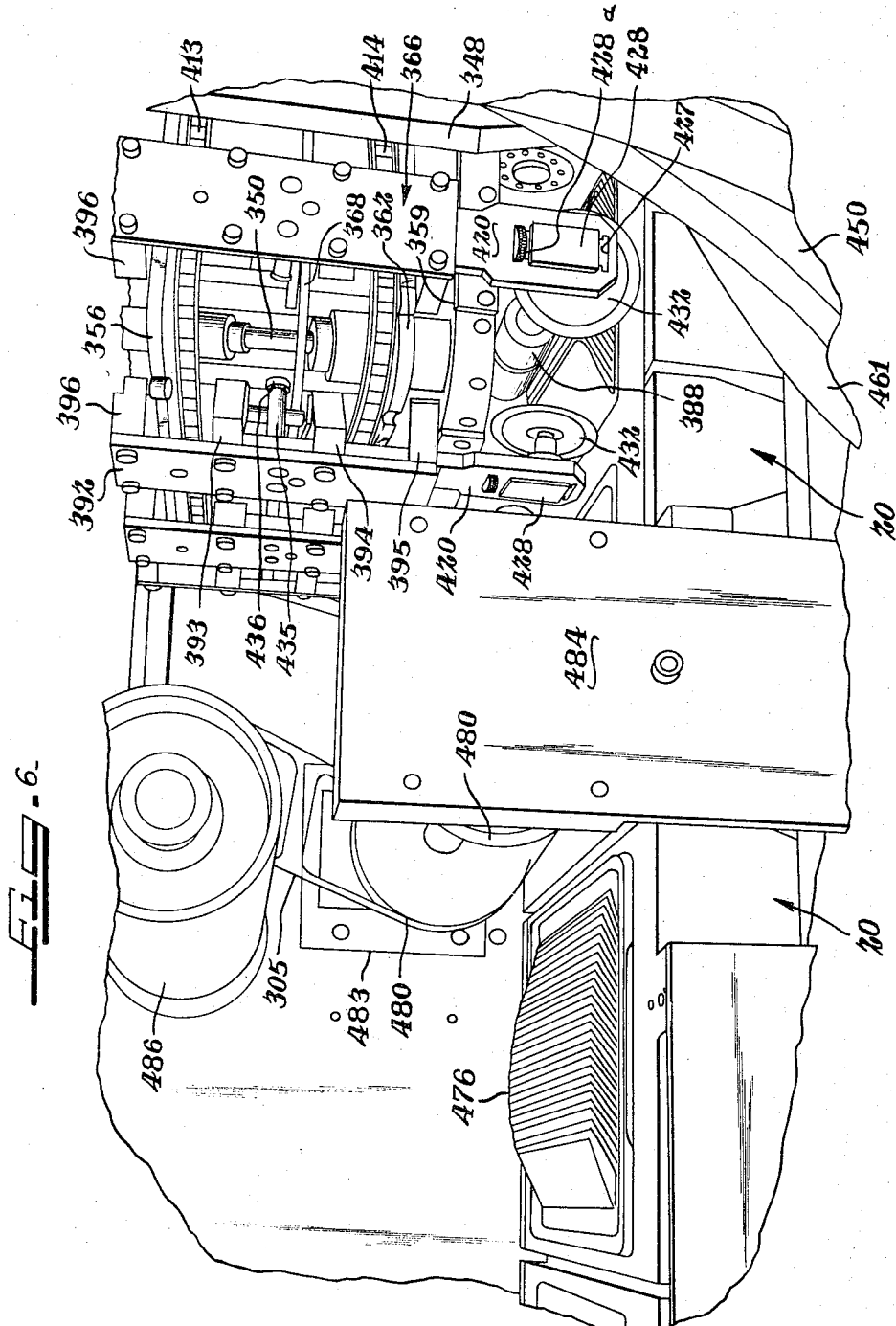

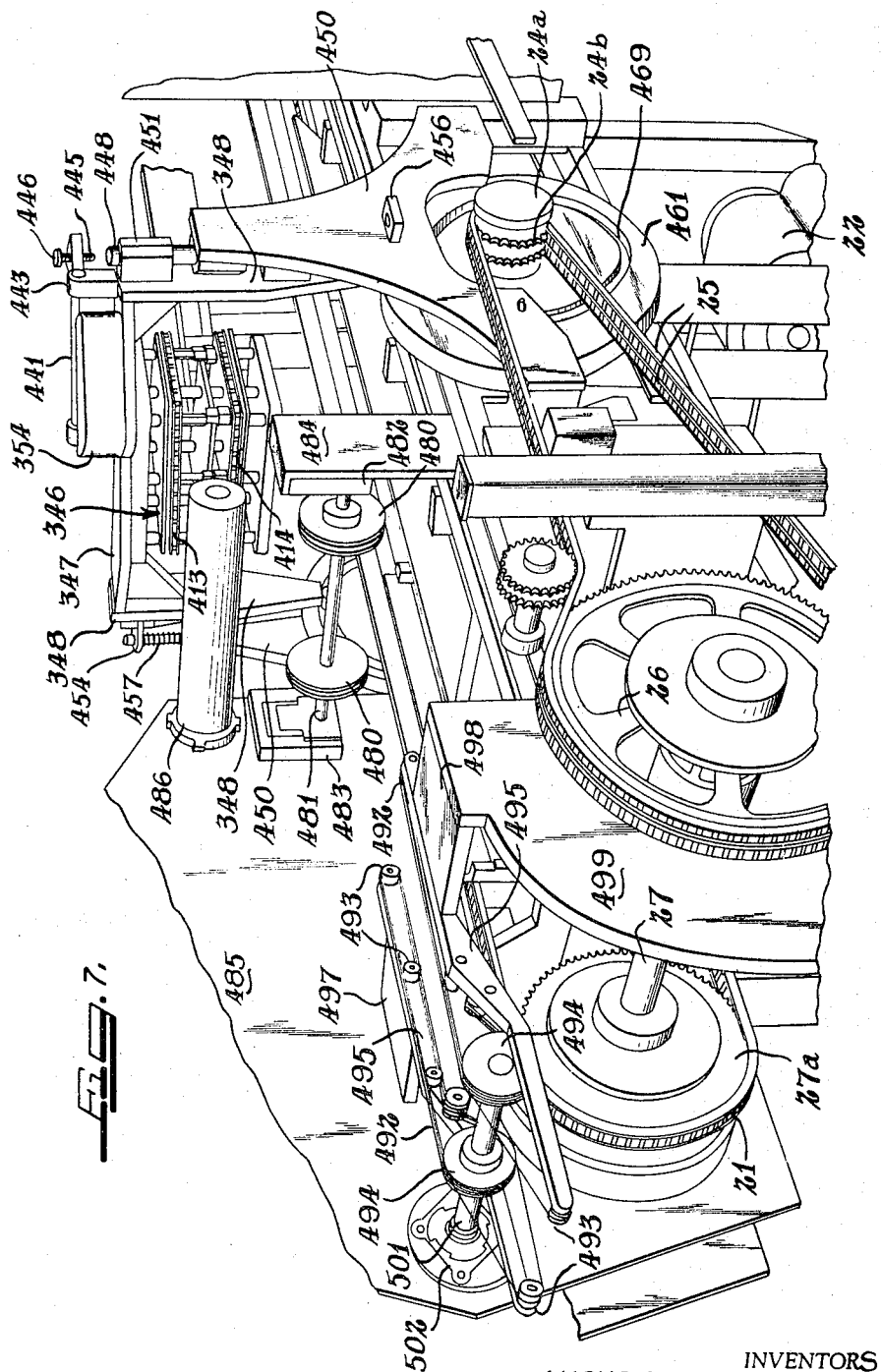

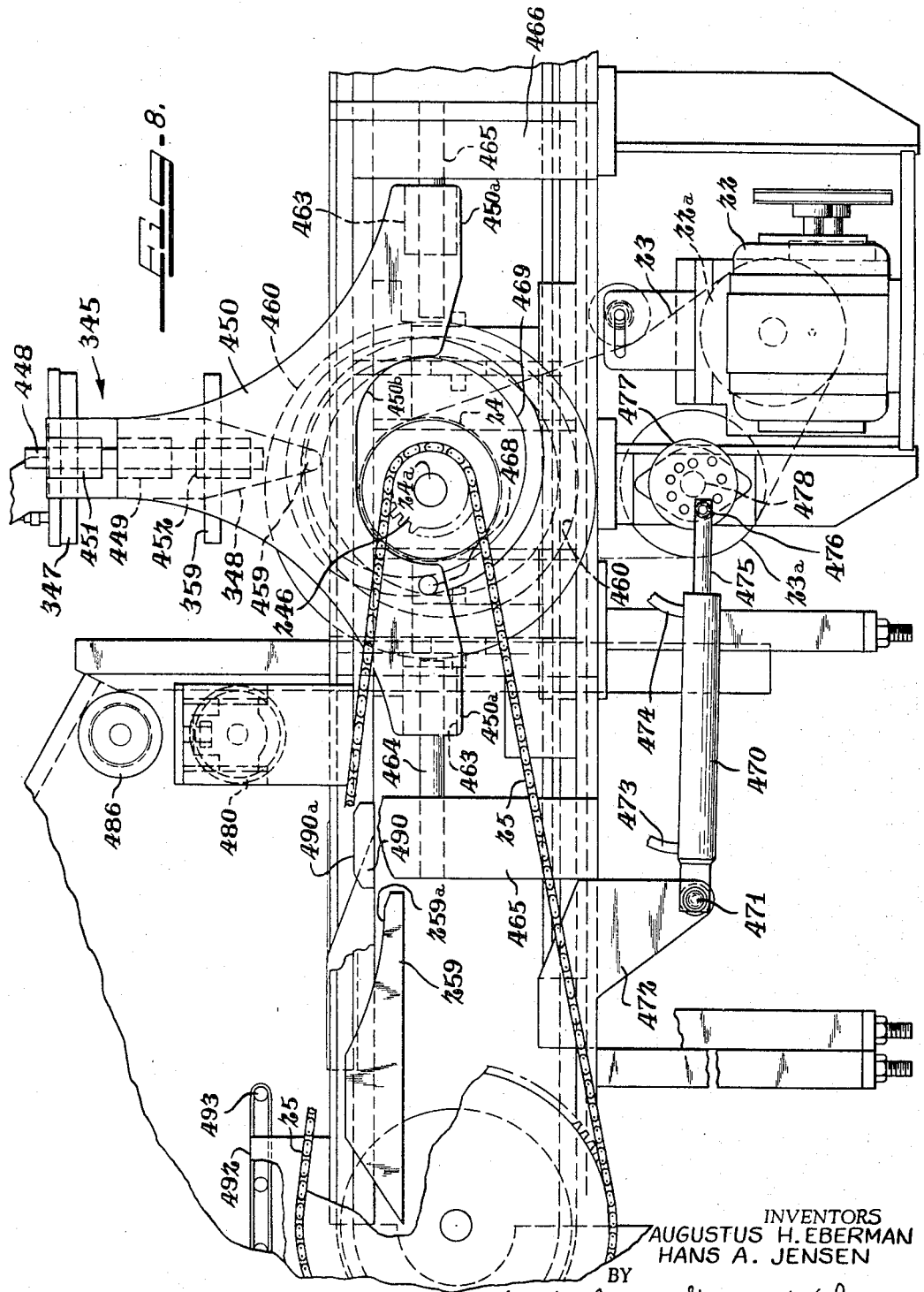

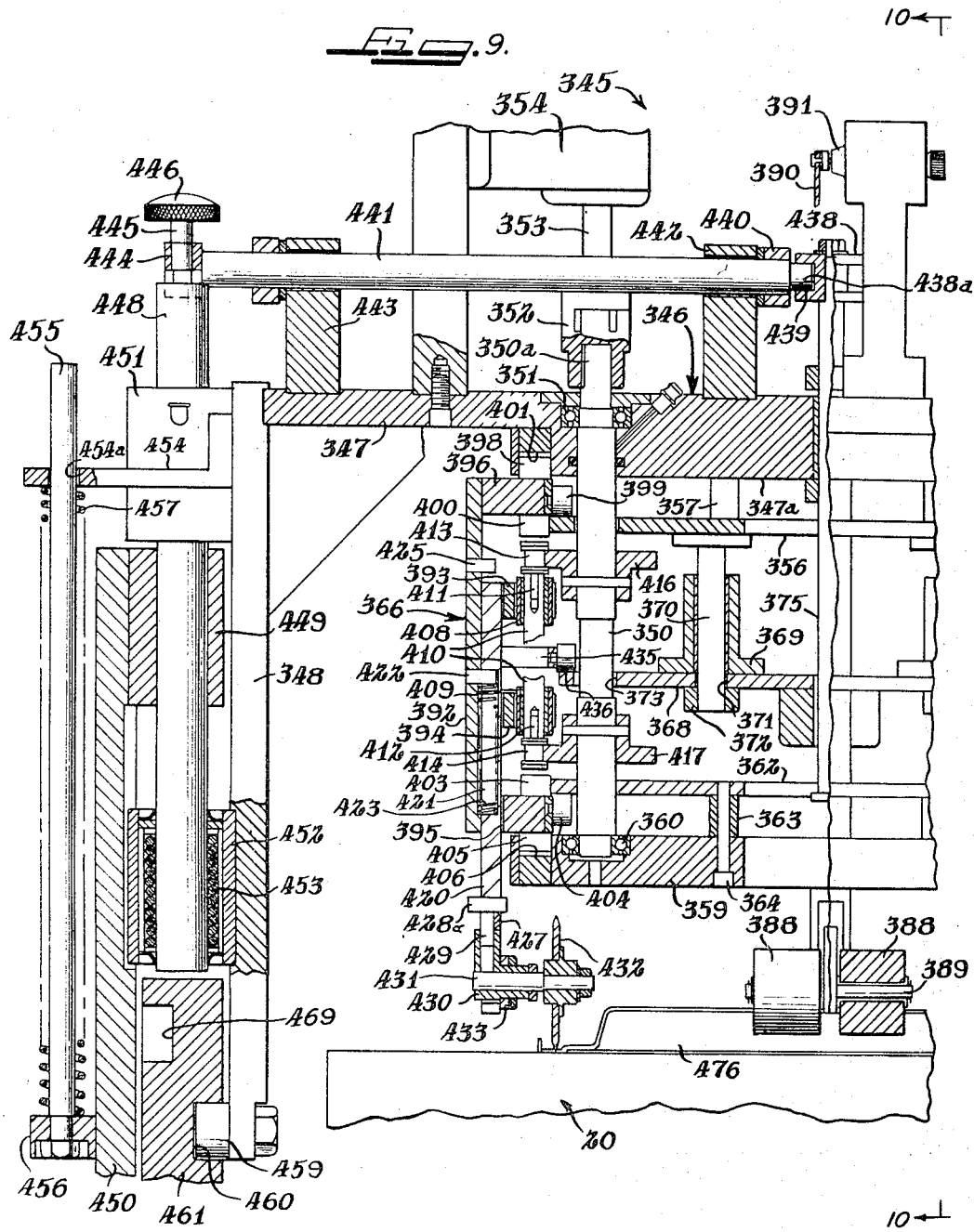

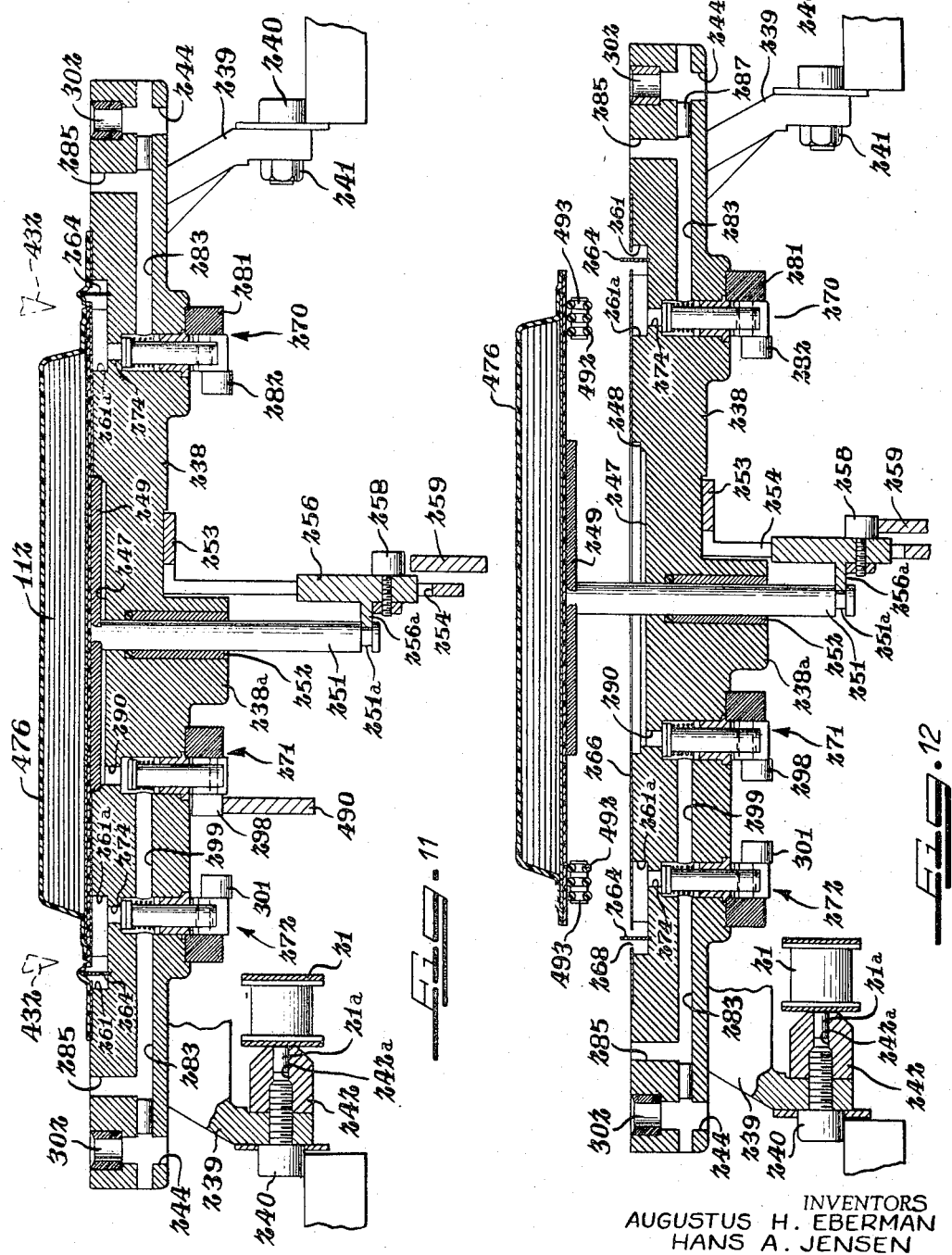

3,348,442
APPARATUS FOR CUTTING MOVING
SHEET MATERIAL
Augustus H. Eberman and Hans A. Jensen, Madison, Wis., assignors to Oscar Mayer & Co., Inc., Chicago, Ill., a corporation of Illinois
Original application July 31, 1963, Ser. No. 299,000, now Patent No. 3,290,858, dated Dec. 13, 1966. Divided and this application Apr. 27, 1966, Ser. No. 560,391
11 Claims. (Cl. 83—318)

ABSTRACT OF THE DISCLOSURE

The completed packages formed in spaced relation longitudinally of the sealed-together films are moved along a horizontal path by a conveyor. A pair of uprights, one on each side of the advancing films, are reciprocated along a horizontal path parallel with the direction of film movement. These uprights mount a head mechanism for vertical reciprocal movement relative to the uprights. The head mounts a plurality of cutting wheels each disposed in a vertical plane and mounted by the head mechanism for movement in an endless horizontal path having a shape corresponding to the peripheral outline of the packages. Cam means move the wheels downwardly into contact with the film and in timed relation with movement of the latter thereby successively to sever the completed packages from the film.

---

This application is a division of our application Ser. No. 299,000, filed July 31, 1963, now Patent No. 3,290,858.

This invention relates generally to cutting apparatus and more particularly to a new and improved apparatus for cutting moving sheet material. The present invention has particular although not exclusive application with a package forming machine by which hermetically sealed packages containing food products or other articles may be automatically and continuously formed.

A primary object of the present invention is the provision of a new and improved cutting apparatus for cutting or trimming advancing sheet or film material in such manner that openings are formed in the latter.

Yet another object of the present invention is the provision in a machine of the type described new and improved means for severing completed packages from a film as the latter is being continuously advanced.

Another object of the present invention is the provision in a machine of the type described of unique cutting means for severing completed packages from package forming film, which means include a plurality of cutting wheels mounted above the film for simultaneous movement in a horizontal continuous path and for movement with the film at a velocity equal to the velocity of the latter, which continuous path corresponds to the peripheral shape of the packages, the cutting wheels being adapted to be brought into temporary contact with the film with the continuous path in registry with the periphery of one of the packages, whereby the cutting wheels sever the film at the periphery of the package as the film is being continuously advanced.

A further object of the present invention is to provide in a machine of the type described a unique cutting means for severing a packaging film around the periphery of the packages formed therein, the cutting means including feeler means engageable with the packages for bringing the cutting elements of the cutting means into operation upon contact of the feeler means with the package.

These and other objects and advantages of the present invention will become apparent from the following specification wherein like numerals refer to similar parts throughout.

In the drawings:
FIG. 1 is a side elevational view, in semi-diagrammatic form, of a continuous package forming machine with which the present invention may be associated;
FIG. 2 is a top plan view of the machine of FIG. 1 with certain parts of the machine being removed for better illustration of the invention;
FIG. 3 is a diagrammatic view showing the operation of the machine;
FIG. 4 is a vertical section taken through a sealed package formed by the machine of this invention;
FIG. 5 is a fragmentary perspective view of the downstream end of the continuous package forming machine primarily showing, the ejector plungers for removal of completed packages, the roller means for winding scrap film, and the cutting means for severing the sealed together films at the periphery of the packages formed therebetween;
FIG. 6 is a close-up perspective view of the cutting means in engagement with the sealed together films for cutting the films around one of the packages being advanced and also showing the scrap film wind-up means;
FIG. 7 is a perspective view of the downstream end of the machine with many parts of the machine being removed for primarily illustrating the mounting of the cutting means and the cam means for actuating the same;
FIG. 8 is a fragmentary side view of the downstream end of the machine, as seen from the left (looking downstream), with certain parts of the machine not being shown for primarily illustrating the cam means for actuating the cutting means and for illustrating the hydraulic ram for actuating the hydraulic motor which forms a part of the cutting means;
FIG. 9 is an enlarged fragmentary view, partially in vertical section and partially in elevation, looking downstream and taken through the cutting means of the machine;
FIG. 10 is a section taken along the line 10—10 of FIG. 9;
FIG. 11 is an enlarged vertical section taken through one of the lower die plates after the latter has passed beneath the cutting means; and
FIG. 12 is a section similar to FIG. 11 showing a completed package being lifted from the face of one of the lower die plates by means of the associated ejector plunger;

Briefly and by way of introduction, the continuous package forming machine includes a lower endless series of die plates for receiving a polyvinylidene chloride film or the like from film extrusion and film supercooling equipment and for advancing the film on the faces of the lower die plates in a horizontal linear path. In effect, the lower series of die plates act as a conveyor for advancing a film, hereinafter referred to as the lower film, through the entire machine. Means in the form of a separate loading conveyor are provided for successively and accurately depositing articles to be packaged in longitudinal spaced-apart relation on the advancing lower film so that the articles are positioned on the film in proper relation with the lower die plates. In the embodiment of the machine shown for purposes of illustration, the articles to be packaged are shown in the form of groups of bacon strips lying on each other in overlapping relation.

An upper endless series of die plates are provided for receiving another film, hereinafter referred to as the upper film, of the type described from film extrusion and supercooling equipment and for advancing the upper film in overlying relation with the lower film at a packaging zone. The upper die plate means are in communication with a source of vacuum and include unique cam operated valve means for forming a series of depressions in the upper film before the latter reaches the packaging zone. The accumulations of the products or articles to be packaged which are longitudinally spaced-apart on the lower film are successively received in the depressions in the upper film as the films are advanced through the packaging zone by the upper and lower die plates, which upper and lower die plates cooperate to form article enclosing vacuum chambers. The upper and lower die plates have respective flange portions extending transversely of the film for physically pressing the films together between the articles to be packaged thereby sealing the films together to form partially completed packages, i.e., marginal portions of the films remain unsealed at this phase of operation. The upper and lower die plates include novel cam actuated valve means for communicating the source of vacuum via the lower die plates to the spaces defined by the partially completed packages for vacumizing the same. The upper and lower die plates include further cam actuated valve means including vent means for vacuum pressing the films into conformity with the contour of the articles to be packaged and for vacuum pressing marginal portions of the films together for sealing of the same thereby forming completed packages.

The completed packages are uncovered by the upper die plates as the packages leave the packaging zone and are conveyed by the lower die plates through a crystallization zone which includes suitable film heating means, such as an infra-red heating unit, which adequately raises the temperature of the sealed together films to an extent that crystallization is sufficiently advanced to overcome the supercooled properties of the films.

The packages are continuously advanced from the crystallization zone to a cutting zone which includes the present invention. This zone includes novel cutting means for severing the films on the lower die plates. The cutting means includes a plurality of depending cutting wheels moving in an endless path and moving with the film, during a portion of its length of travel, for severing the films around the periphery of the packages for separating the latter from the films.

The lower die plates include novel means for holding by vacuum the lower film to the faces of the lower die plates as the latter pass through the cutting zone for preventing movement of the films as they are being severed by the cutting means. Roller means are provided for winding the scrap film which remains after the completed packages have been severed from the films.

The lower die plates include ejector plungers which are disposed in the faces of the lower die plates beneath the packages formed thereon. The plungers are adapted to be lifted from the faces of the die plates by cam means after the lower die plates have passed through the cutting zone for transfer of the completed packages to a delivery conveyor, for example.

Referring now to the drawings and in particular FIG. 1, the continuous package forming machine primarily includes, in serial relation progressing along the direction of travel of the films or in a "downstream" direction, a loading zone 10, a packaging zone 12, a crystallization zone 14, a cutting zone 16 and a scrap film wind-up and package delivery zone 18. The rectangular object diagrammatically illustrated in FIG. 1 in zone 14 represents an electrical junction box for controlling electrical components of the machine, such as the drive motors thereof.

The lower die plate means include an endless series of die plates 20 each being supported for movement in an endless path by rollers guided in trackways which form a part of the supporting structure of the continuous package forming machine. Lower die plates 20 are articulated on a pair of endless chains 21 (FIG. 3) driven by suitable motor means, such as an electric motor 22 illustrated in FIG. 1. Referring momentarily to FIGS. 7 and 8, motor 22 drives a gear box having a sprocket wheel 22a for driving a chain 23 (shown in broken lines) which is trained over a sprocket wheel 23a and rotates a further sprocket wheel 24 fixed on a cross shaft 24a. Shaft 24a is rotatably mounted in the supporting structure of the machine and includes suitable sprocket portions 24b at one end thereof for driving a pair of juxtaposed chains 25, which chains are trained over a double sprocket wheel 26 fixedly mounted on a cross-shaft 27. Shaft 27 is rotatably mounted in the supporting structure of the machine and carries sprocket wheels 27a in driving engagement with lower die plate chains 21.

The present invention has to do with a cutting or trimming mechanism, generally designated 345, as best seen in FIGS. 5 through 10. The cutting mechanism, which may form a part of the aforedescribed continuous packaging machine, primarily includes a head mechanism 346 suspended from a transversely extending cross member 347, which member has opposite ends thereof suitably secured to a pair of parallel, vertical members 348. A plurality of vertically extending shafts 350 are rotatably mounted at upper ends thereof, as by bearing assemblies 351, in cross member 347. One shaft 350 is illustrated in FIG. 9, which shaft has a co-axial upwardly extending extension 350a keyed to a coupler 352, which coupler is suitably secured to a depending drive shaft 353 of a hydraulic motor 354. Only one of the vertically extending shafts 350, which are positioned in a generally rectangular path in a horizontal plane, is coupled to a hydraulic motor 354. A generally rectangular plate 356 is mounted in parallel, vertical spaced-apart relation beneath a depending rectangular portion 347a of member 347 by means of a plurality of suitable brackets 357.

Head mechanism 346 further includes a lower generally rectangular plate 359 having spaced-apart bearing assemblies 360 in engagement with the lower ends of shafts 350. A further horizontally extending plate 362 is mounted in parallel vertically spaced-apart relation above plate 359 by means of a plurality of spacers 363 and associated pins 364. Plates 356, 362, 359 and plate portion 347a have identical peripheral shapes and are in vertical alignment. The peripheral surfaces of these members define guide tracks for guiding a plurality of equally spaced-apart cutting members 366 in an endless horizontal path around the head mechanism. Plates 356 and 362 include respective co-axial openings for freely receiving shafts 350.

A horizontally disposed plate 368 is mounted in the head mechanism for vertical reciprocal movement relative to the latter. Plate 368 is mounted in the head mechanism in the manner just described by means of a plurality of bushings 369 secured to the upper surface of the plate and slidably engageable with respective depending pins 370, which pins are secured to the underside of plate 356. Plate 368 includes a plurality of openings 371 for freely receiving pins 370, each of which pins has a ring-like seat 372 secured to the lower or free end thereof for abutting the underside of plate 368. The lowermost position of plate 368 relative to the head mechanism is fixed by abutting engagement of the underside of the plate with the upper surfaces of seats 372. Plate 368 includes a number of openings 373 for freely receiving shafts 350.

As best seen in FIGS. 9 and 10, plate 368 has a centrally disposed opening 374 for freely receiving a vertically extending rod 375. A block 376 is secured to the underside of plate 368 and includes a central opening 377 co-axial with opening 374. A sear 378 is pivotally mounted in a suitable slot in block 376 by a pin 379 for swinging movement in a vertical plane, which sear has a foot 378a adapted for engagement with the upper surface of an annular flange 375a formed on the lower end of rod 375. A rod 380 is pivotally mounted by a pin 381 to sear 378, which rod extends downwardly through respective openings 362a and 359a in plates 362 and 359. A clevis 383 is secured to the lower end of rod 380 and has a bar 384 pivotally mounted in the bifurcated portion thereof by a pin 385. One end of bar 384 is pivotally mounted by a pin 386 from a depending lug 387 secured to the underside of plate 359 adjacent the central enlarged opening therein. A pair of co-axial package engaging rollers 388 are mounted to the other end of bar 384 one on each side thereof by a pin 389.

As noted in FIG. 10, a vertically extending bar 390 has the lower end thereof pivotally mounted to sear 378 at pin 381. The upper end of bar 390 is operatively associated with a counter 391, of known construction, for counting packages formed by the continuous packaging machine. The actuation of this counter will be referred to hereinbelow. Openings 356a and 347a are provided in respective members 356 and 347 for freely accommodating vertically extending bar 390.

All cutting wheel assemblies 366 are of identical construction. Each assembly 366 includes a vertically extending outer plate 392 having three, horizontally extending, vertically spaced-apart guide blocks 393, 394 and 395 secured thereto. Secured to the upper end of each plate 392 is an upper block 396. Block 396 has upper, inner and lower rollers 398, 399 and 400, respectively, suitably secured thereto. Roller 398 is adapted for rolling movement in an endless guide trackway 401 formed around the periphery of depending portion 347a cross member 347. Rollers 399 and 400 are adapted for rolling movement on the upper marginal surface and vertical edge, respectively, of plate 356.

Each guide block 395 mounts an upper roller 403, an inner roller 404 and a lower roller 405. Upper roller 403 and inner roller 404 are adapted for respective rolling engagement with the vertical edge and lower marginal portion of plate 362. Lower rollers 405 are adapted for rolling engagement in endless guide trackways 406 formed on the periphery of lowermost plate 359. It should be apparent that each plate 392 is adapted for movement in an endless path in a horizontal plane by rolling engagement of the various rollers just described on the various plates making up the head mechanism.

Guide blocks 393 and 394 of each cutting assembly 366 include co-axial bores at the inner ends thereof for receiving sleeves 408 and 409. Sleeves 408 and 409 rotatably mount a vertically extending rod 410 which receives at its opposite ends opposed pins 411 and 412, which pins form a part of respective endless chains 413 and 414. Chains 413 and 414 are driven by respective sprocket wheels 416 and 417, which sprocket wheels are mounted in vertical spaced-apart relation on shafts 350. As only one shaft 350 is driven by hydraulic motor 354, the remaining sprockets act as idler sprockets for guiding the chains in their endless path around the head mechanism. It should be apparent that actuation of motor 354 results in movement of cutting assemblies 366 in an endless horizontal path around the head mechanism.

Guide blocks 393, 394 and 395 include aligned openings for freely receiving a lower vertically extending plate 420 for vertical reciprocal movement of the latter along the inside surface of plate 392. Each plate 420 includes a vertically extending rectangular slot 421, the upper end of which slot is adapted to engage a stop member 422 secured to plate 392 and extending inwardly thereof. A spring 423, diagrammatically shown in FIG. 9, constantly urges plate 420 downwardly. A second stop 425 secured to plate 392 and extending inwardly thereof is adapted to be abutted by the upper end of plate 420 for limiting upward movement of the latter relative to plate 392.

Each plate 420 includes a further vertically extending rectangular opening 427 (FIG. 6) in the lower end thereof for receiving a guide block 428 for vertical reciprocal movement relative to plate 420. It will be understood that block 428 has vertically extending grooves at opposite sides thereof for slidably receiving corresponding sides of opening 427 to permit sliding movement of the guide block relative to plate 420. A knurled nut 428a suitably mounted to plate 420 in the upper end of opening 427 has a threaded shank portion 429 (FIG. 9) threadingly engageable in an upstanding bore in a hub member 430. Hub member 430 supports a horizontally extending axle 431 rotatably mounting a cutting wheel 432. The horizontally extending sleeve portion of the hub supporting pin 431 is extrenally threaded for receiving a pair of lock nuts 433. The innermost lock nut is adapted for frictional engagement with the inner side of plate 420. Knurled nut 428a provides means for adjusting the vertical position of cutting wheel 432 relative to plate 420, and lock nuts 433 provide means for locking hub 430 to plate 420 after the former has been adjusted. It will be apparent that cutting wheels 432 are moved in an endless horizontal path upon actuation of motor 354. The various roller engaging plates of the head mechanism are shaped so that this path corresponds with the peripheral shape of the packages formed between the advancing upper and lower films.

Each plate 420 has secured thereto near its upper end an inwardly extending rod 435 mounting a roller 436 at the free end thereof. Rollers 436 are adapted for rolling engagement around the upper marginal surface of plate 368.

A collar 438 is secured to the upper end of rod 375 which collar includes an annular recess 438a having a roller 439 received therein, the roller being mounted to one end of a crank arm 440, the other end of which crank arm is mounted to one end of a cross shaft 441. Cross shaft 441 is journaled in suitable openings in a pair of upright members 442 and 443 mounted on plate 347. A second crank arm 444 is secured to the outer end of cross shaft 441, and crank arm 444 has a vertically extending threaded bore in the free end thereof for threading engagement with shank 445 of a knurled knob 446. Lower end of shank 445 is adapted for abutting engagement with the upper end of one of a pair of posts 448, which posts are fixed in respective sleeves 449 secured to the inner upper portions of a pair of upright members 450. Crank arms 440 and 444 are configured on opposite ends of cross shaft 441 so that upward movement of shank 445, as by its engagement of the upper end of the associated post 448, causes upward movement of rod 375 in the head mechanism.

The head mechanism is supported by separate structures at opposite sides of the machine, the structures being opposite hand but otherwise identical versions of each other. As best seen in FIG. 9, each vertical member 348 of the head mechanism has a pair of aligned bearing assemblies 451 and 452 secured in vertical spaced-apart relation on the outer surface thereof, which bearing assemblies are adapted for reciprocal sliding movement on the corresponding post 448. Bearing assembly 452 is shown in cross section in FIG. 9 and includes ball bearing elements 453. A right angle bracket 454 extends outwardly from the upper end of vertical member 348 around bearing assembly 451, which bracket has an opening 454a in the horizontal leg thereof for freely receiving a shaft 455. Shaft 455 is supported at the lower end thereof by a block 456 secured to the outer surface of the associated upright member 450. A coil spring 457 encircles shaft 455 and has one end thereof abutting the upper surface of block 456 and has the other end thereof abutting the underside of bracket 454 around the opening therein. It will be apparent that springs 457 constantly urge the head mechanism upwardly.

Each vertical member 348 has a cam roller 459 at the lower end thereof. Cam rollers 459 are engaged in respective inner cam tracks 460 formed in the inner faces of a pair of cam wheels 461, the cam wheels being mounted on shaft 24a for rotation with the same. Continuous cam tracks 460 are substantially circular and are eccentrically mounted with respect to the center of cam wheels 461. It will be apparent that rotation of cam wheels 461 produces vertical reciprocation of the head mechanism by reason of the rolling engagement of cam wheels 459 in cam tracks 460, the head mechanism being adapted for reciprocation in a vertical plane by reason of the sliding engagement of bearing assemblies 451 and 452 on posts 448 as explained above.

As best seen in FIGS. 7 and 8, each upright member 450 is in the form of an inverted, generally Y-shaped member having horizontally disposed leg portions 450a. A pair of aligned bearing assemblies 463 are secured to the inside vertical surfaces of leg portions 450a adjacent the outer ends thereof. Bearing assemblies 463, which may be of identical construction to bearing assembly 452 illustrated in FIG. 9, slidably receive coaxial, longitudinally extending rods 464 and 465. Forward rods 464 are suitably secured to upright members 465 forming a part of the supporting structure of the machine, and rearward rods 465 are suitably secured to upright members 466 also forming a part of the supporting structure of the continuous packaging machine. It will be understood that both upright members 450 are adapted for horizontal reciprocal movement between upright members 465 and 466. Each upright member 450 includes a cutaway portion 450b in the lower edge thereof for accommodating shaft 24a during horizontal reciprocation of the upright members.

Each upright member 450 has a cam roller 468 mounted on the inner vertical surface thereof adjacent cut-out portion 450b, which roller is adapted for rolling movement in a continuous substantially circular cam track 469 formed in the outer surface of cam wheel 461 eccentric with respect to the center of the latter. It should be apparent that rotation of cam wheels 461 produce horizontal reciprocal movement of the uprights by reason of the rolling engagement of cam rollers 468 in cam tracks 469.

Means are provided for automatically energizing hydraulic motor 354 in timed relation with movement of the head mechanism, which head mechanism is simultaneously and continuously reciprocated in horizontal and vertical planes by reason of cam rollers 459 and 468 rolling in respective cam tracks 460 and 469 of the cam wheels. Such means include a hydraulic ram 470 (FIG. 8) having one end thereof pivotally mounted by a pin 471 to a depending plate 472 forming a part of the supporting structure of the continuous packaging machine. A pair of hydraulic lines 473 and 474 (FIGS. 5 and 8), suitably connected with one way check valves and a reservoir (not shown), communicate ram 470 on opposite sides of the piston therein with hydraulic motor 354. The hydraulic ram includes a piston rod 475 having the outer end thereof pivotally mounted by a pin 476 in one of a series of apertures in a wheel 477. The holes in wheel 477 are formed therein at varying radii for adjusting the length of the stroke of piston rod 475 upon rotation of wheel 477. Wheel 477 is mounted on a shaft 478, which shaft is secured to wheel 23a and is hereby driven by the main drive motor 22. Hydraulic ram 470 is actuated in timed relation with movement of the lower die plates and the combined movements of the head mechanism, all of which components are driven from a common drive means, viz, motor 22. The operation of cutting means 345 is as follows:

The continuously moving lower die plates advance the sealed together films having completed packages formed in longitudinally spaced-apart relation therebetween to cutting zone 16. The continuously moving cam wheels 461 cause continuous vertical reciprocation of the head mechanism relative to the uprights and cause continuous horizontal reciprocation of the uprights relative to the supporting structure of the machine. The angular velocity of the cam and the interrelation of the various parts are such that the uprights are advanced in a forward or downstream direction with a velocity equal to the velocity of the lower die plates. The various parts of the cutting means are designed so that the uprights begin their forward stroke when the horizontal endless path defined by the path of movement of cutting wheels 342 is in registry with the periphery of one of the completed packages 476 being advanced on the lower die plates. Simultaneous with the beginning of the forward stroke of the uprights, the head mechanism begins its downward stroke relative to the uprights. After the head mechanism moves nearly its entire distance downwardly, the lower end of shank 445 of knurled nut 446 abuts the top of the associated fixed post 448. This contact of shank 445 with the associated post 448 causes upward movement of rod 375 relative to the downwardly traveling head mechanism by reason of cross shaft 441 and the crank arms at opposite ends of the latter.

As best seen in FIG. 10, upward movement of rod 375 relative to the downwardly traveling head mechanism causes corresponding upward relative movement of plate 368 by reason of the engagement of sear 378 with flange 375a. Relative upward movement of plate 368 causes corresponding upward relative sliding movement of plates 420 by reason of the engagement of cam rollers 436 on the upper marginal portion of plate 368.

However, just prior to the time rod 375 would commence its upward relative movement for causing upward movement of plates 420 (and accordingly cutting wheels 432) relative to the downwardly traveling head mechanism, rollers 388 are engaged by the leading inclined surface of one of the completed packages 476. This engagement of rollers with the package causes clockwise rotation of sear 378 (as seen in FIG. 10) thereby moving sear foot portion 378a clear of the upper annular surface on flange 375a. Accordingly, the upward relative movement of rod 375 no longer causes corresponding upward relative movement of plate 368, as the rod is now adapted for free sliding movement relative to plate 368 and block member 376 secured to the underside thereof. Accordingly, plates 420 are not moved upwardly relative to plates 392 and are forced downwardly by means of the springs 423 for contact of cutting wheels 432 with the sealed together films around the periphery of the package to be severed or trimmed from the advancing films.

During the downward movement of the head mechanism, ram 470 is actuated at the proper time for forcing hydraulic fluid through conduit 473 to the hydraulic motor for actuation of the latter. As explained above, actuation of the hydraulic motor causes movement of the cutting assemblies 366 in an endless horizontal path around the head mechanism. The hydraulic motor and the ram for actuating the same are arranged so that movement is imparted to the cutting wheels just before they come into contact with the films and movement of the wheels continue for a short period of time after the wheels have separated from the severed films.

It should be apparent from the above description that the completed packages are severed at their peripheries as they are continuously advanced by the lower die plates through the cutting zone. The head mechanism is continuously reciprocated in vertical and horizontal planes in timed relation with the advancing completed packages for bringing the cutting wheels into contact with the films with the horizontal endless path defined by the cutting wheels in registry with the periphery of the packages. The cutting wheels are held in contact with the film for a sufficient length of time for the cutting wheels to sever the films around the periphery of the packages. This is accomplished by providing cam track 460 with a flattened portion. The cutting wheels, of course, need only move a distance in their horizontal path equal to the spacing between the cutting wheels. In actual practice, each cutting wheel moves a distance approximately equal to 1¾ of the spacing between the cutting wheels.

The constantly rotating cam wheels 461 lift the head mechanism from the films after a package has been severed and simultaneously move the mechanism rearwardly or upstream for continuously and successively severing completed packages being advanced in a continuous manner. During this constant reciprocation of the head mechanism, the hydraulic motor supported thereon is automatically actuated in timed relation with movement of the head mechanism to impart movement to the cutting wheels at an appropriate time for severing the films around the periphery of the package.

If for some reason rollers 388 are not engaged by a package, i.e., if by inadvertence a product was not placed on one of the loading conveyor trays thereby leaving the lower film empty over one of the lower die plates, the cutting wheels are not brought into contact with the sealed films over this one lower die plate. If rollers 388 are not engaged by a package, foot 378a of the sear is not removed from annular flange 375a on vertical rod 375. Therefore, the rod moving upwardly relative to the downwardly traveling head mechanism continues to move plate 368 upwardly as the head mechanism is being cammed downwardly. Accordingly, plates 420 are moved upwardly relative to the downwardly traveling head mechanism against the force of springs 423 by reason of the engagement of cam rollers 436 with the upper marginal portion of plate 368. When the head mechanism reaches its lowermost point of travel, the cutting surfaces of the cutting wheels are spaced a minute distance above the films (when rollers 388 are not engaged by a package). By providing cutting means 345 with rollers 388 and their related components, only filled packages are advanced beyond the cutting zone by the lower die plates.

As the cutting wheels sever a package from the films, the cutting wheels roll in an endless path on insert plate 266 of the lower die plate. The insert plates may be replaced after they have become grooved by the cutting action of the cutting wheels.

It will be apparent from FIG. 10, that engagement of rollers 388 with a package causes upward vertical movement of bar 390. Upward movement of the bar actuates counter 391 for counting packages formed by the continuous packaging machine.

Means are provided for collecting or winding scrap film which is formed after the films have been severed to separate the completed product filled packages therefrom. The scrap film is a continuous film having a plurality of longitudinally spaced-apart openings formed therein by the cutting means. As seen in FIGS. 5 through 8, the wind-up means includes a pair of vertically disposed wheels 380 spaced transversely of the machine on the cross shaft 481, which shaft has opposite ends thereof mounted in bearing assemblies 482 and 483. Bearing assembly 482 is supported from an upright member 484 forming a part of the forming structure of the continuous packaging machine. Bearing assembly 483 is suitably mounted to one side of a housing wall 485 also forming a part of the supporting structure of the machine. The scrap film is trained under wheels 480 and then over a drum 486 which is rotatably mounted at one end thereof from housing wall 485 for rotation about an axis parallel with shaft 481. Scrap film is then wound on a wind-up cylinder 488 which is rotatably mounted at one end thereof from housing wall 485. Cylinder 488 is rotated by suitable power take-off means (not shown) from the main drive means of the continuous package forming machine.

As the lower die plates advance the separated completed packages along the downstream portion of zone 18, cam roller 298 of valve assembly 271 of each lower die plate is engaged by a lower longitudinally extending cam track 490 (FIGS. 8 and 11) having a cam face 490a. This results in opening of valve assembly 271 for communicating the vacuumized thin annular space around the periphery of ejector plunger 249 with port 285, which port is opened to atmosphere after separation of the upper and lower die plates. Accordingly, the vacuum at the underside of the lower film, i.e., at the underside of each completed package, is now broken. As the completed packages continue to travel through zone 18, cam roller 258 associated with reciprocating guide 256 is engaged by longitudinally extending cam track 259 having a forwardly and upwardly curved cam face 259a. This engagement of cam track 259 with roller 258 results in upward movement of plunger 249 from the face of the associated lower die plate.

As the completed packages are lifted in series as the lower die plates are advanced through zone 18, the completed packages are engaged at the underside of side marginal portions thereof by a pair of endless moving belts 492. Belts 492 are trained around longitudinally spaced-apart idler rollers 493 (FIG. 7) and are wound around drive rollers 494. Rollers 493 are supported by a pair of laterally spaced-apart longitudinally extending bars 495, which bars are mounted on laterally extending brackets 497 and 498. Bracket 497 is mounted from housing wall 485. Bracket 498 is mounted from a vertically extending plate 499 forming a part of the supporting structure of the machine. Rollers 494 are supported on a common cross shaft 501, which shaft is rotatably mounted at one end thereof by a bearing assembly 502 secured to the inside surface of housing wall 485. Suitable power take-off means (not shown) from the main drive means of the machine are provided for rotating shaft 501. It should be apparent that completed packages deposited on the endless traveling belts 492 are carried forwardly or downstream for deposit on suitable means, such as a conveyor assembly 503 (FIG. 5).

After the completed packages have been removed from the lower die plates by the means just described, the lower die plates returned along their lower horizontal path for continuous reuse in the package forming operation. During movement of the lower die plates along their lower horizontal path, the ejector plungers of the lower die plates are preferably returned to their seated position in the circular recesses in the lower die plates. This is accomplished by means of a cam track 505 (not shown) extending longitudinally for substantially the entire length of the continuous package forming machine. This cam track engages cam rollers 258 on guide assemblies 256 for retraction of the ejector plungers and for holding the same in their seated position in the lower die plates. Other cam track means (not shown) adapted for engagement with rollers 257 are provided at the upstream end of the machine to hold the ejector plungers in place during movement of the lower die plates between their lower horizontal path and their upper horizontal path.

While the invention has been shown in but one form it will be obvious to those skilled in the art that it is not to be so limited, but on the contrary it is susceptible of various changes and modifications without departing from the spirit and scope of the appended claim.

We claim:

1. Mechanism for cutting a sheet of packaging film having a plurality of packages formed at least in part thereby longitudinally spaced-apart along the film, wherein the film is continuously advanced in a continuous package forming machine, said mechanism comprising, means mounting cutting means above said film in vertical spaced relation above the latter, said means including further means for simultaneously driving said cutting means to describe a horizontal continuous path and to move with said film, during a portion of its travel, at a velocity equal to the velocity of the film, which path generally corresponds to the peripheral shape of said packages, other means for temporarily bringing said cutting means downwardly into contact with said film at a point at the margin of one of said packages with said path in registry with the periphery of said one package, whereby said cutting means severs said film at the periphery of said one package as the latter is being continuously advanced.

2. Means for cutting a sheet of packaging film having a plurality of packages formed at least in part thereby longitudinally spaced-apart along the film, wherein the film is continuously advanced in a continuous package forming machine, said means comprising, a head mechanism supported above said film by uprights at opposite sides of the film for vertical reciprocating movement relative to the uprights, the uprights being mounted for reciprocating movement in a horizontal path parallel to the direction of movement of said film, said head mechanism having a plurality of vertically disposed cutting wheels depending therefrom and mounted for movement relative thereto in an endless horizontal path, which path generally corresponds to the peripheral shape of said packages, the lowermost peripheral portions of the cutting wheels being substantially co-planar, motor means for moving the cutting wheels in said endless horizontal path, means acting in timed relation with movement of said film for periodically and substantially simultaneously, moving said uprights forwardly with a velocity equal to the velocity of the film and with said endless horizontal path in registry with the periphery of one of said packages, moving said head mechanism downwardly for engagement of said cutting wheels with the film, and actuating said motor means, whereby said one package is separated from the film as the latter is being continuously advanced.

3. Means for cutting a sheet of packaging film having a plurality of packages formed at least in part thereby longitudinally spaced-apart along the film, wherein the film is continuously advanced in a continuous package forming machine, said means comprising, a head mechanism supported above said film by uprights at opposite sides of the film for vertical reciprocating movement relative to the uprights, the uprights being mounted for reciprocating movement in a horizontal path parallel with the direction of movement of said film, said head mechanism having a plurality of vertically disposed, equally spaced-apart, free-wheeling, cutting wheels depending therefrom and mounted for movement relative to the head in an endless horizontal path generally corresponding to the peripheral shape of said packages, the lowermost peripheral portions of the cutting wheels being substantially co-planar, motor means for moving the cutting wheels in said endless horizontal path, means acting in timed relation with the movement of said film for periodically and substantially simultaneously moving said uprights forwardly with a velocity equal to the velocity of the film and with said endless horizontal path in registry with the periphery of one of said packages, moving said head mechanism downwardly for contact of said cutting wheels with the film, and actuating said motor means for moving the cutting wheels a distance along said endless horizontal path equal to at least the spacing between the cutting wheels, whereby said one package is separated from the film as the latter is being continuously advanced.

4. The construction according to claim 3 wherein said motor means includes a hydraulic motor.

5. The contruction according to claim 4 wherein said hydraulic motor is actuated by a hydraulic ram connected with the motor by hydraulic lines, which ram is operated by means constantly moving in timed relation with said film.

6. Means for cutting a sheet of packaging film having a plurality of packages formed at least in part thereby longitudinally spaced-apart along the film, wherein the film is continuously advanced in a continuous package forming machine, said means comprising, a frame supported above said film for horizontal reciprocating movement in a path parallel to the direction of movement of the film, a head mechanism supported from said frame for vertical reciprocal movement relative thereto, said head mechanism having vertically disposed cutting means depending therefrom and mounted for movement in an endless horizontal path relative to the head mechanism, which endless horizontal path generally corresponds to the peripheral shape of said packages, releasable means on said head mechanism for preventing contact of the cutting means with the film when the head mechanism is in its lowermost position, depending feeler means connected to said releasable means for releasing the latter upon contact with said one package to permit the cutting means to contact the film when the head mechanism is in its lowermost position, motor means for moving the cutting means in said endless horizontal path, means acting in timed relation with movement of said film for periodically and substantially simultaneously, moving said frame forwardly with a velocity equal to the velocity of the film and with said endless horizontal path in registry with the periphery of one of said packages, moving said head mechanism downwardly to said lowermost position, and actuating said motor means, whereby said packages are separated from the film as the latter is being continuously advanced.

7. The construction according to claim 3 further defined by, said machine including a series of die plates supporting and advancing said film, said die plates including valve actuated means for holding the packages to respective die plates by means of a vacuum, cam means arranged to be successively engaged by the valve actuated means of each die plate for releasing such vacuum after each package has been separated from the film.

8. The construction according to claim 6 wherein said releasable means includes a member engageable with another member fixed on said frame for causing upward movement of said cutting means relative to said head during downward movement of the latter, said feeler means cooperating with said releasable means upon contact of the former with a package to prevent such movement of the cutting means relative to the head thereby to allow the former to continue downwardly with the latter for severing the film.

9. The construction according to claim 6 wherein said cutting means includes a plurality of wheels having peripheral cutting edges, the lowermost portions of such wheels being substantially coplanar.

10. An apparatus for successively cutting a sheet as the same is advanced thereby to form a number of openings in such sheet which are spaced longitudinally of the latter, said apparatus comprising, a head and cam means mounting the same for movement in timed relation with movement of the sheet, cutting means mounted by said head for movement relative thereto, driving means for moving the cutting means relative to the head for describing a continuous path contained in a plane parallel with the sheet and having a shape corresponding to the shape of an opening to be formed, other means including said cam means serving to place said cutting means in contact with said sheet when the former is being moved in its continuous path and simultaneously preventing relative movement between the head and the sheet thereby to allow the cutting means to form an opening in the sheet having a shape corresponding to the shape of said continuous path.

11. The apparatus according to claim 10 wherein said cutting means includes a plurality of substantially equally spaced wheels each having a peripheral cutting edges.

References Cited

UNITED STATES PATENTS

| | | | |
|---|---|---|---|
| 1,945,063 | 1/1934 | Moone | 83—320 |
| 2,605,841 | 8/1952 | Overman | 83—318 |
| 2,649,909 | 8/1953 | Lilley et al. | 83—565 X |

ANDREW R. JUHASZ, *Primary Examiner.*